United States Patent [19]

Itagaki et al.

[11] Patent Number: 5,037,927
[45] Date of Patent: Aug. 6, 1991

[54] VINYLAMINE COPOLYMER AND PROCESS FOR PRODUCING SAME

[75] Inventors: Takaharu Itagaki, Yokohama; Mitsuaki Shiraga, Machida; Shigeru Sawayama, Yokohama; Kohichi Satoh, Zama, all of Japan

[73] Assignee: Mitsubishi Chemical Industries, Ltd., Tokyo, Japan

[21] Appl. No.: 231,604

[22] Filed: Aug. 10, 1988

Related U.S. Application Data

[63] Continuation of Ser. No. 65,811, Jun. 23, 1987, abandoned.

[30] Foreign Application Priority Data

Jun. 30, 1986 [JP]  Japan ................................ 61-153876

[51] Int. Cl.$^5$ ........................................... C08F 218/02
[52] U.S. Cl. .............................. 526/307.7; 526/303.1
[58] Field of Search ......................... 526/303.1, 303.7

[56]  References Cited

U.S. PATENT DOCUMENTS 4,421,602 12/1983 Brunnmueller et al. ..... 526/303.1 X
4,490,557 12/1984 Dawson et al. ............. 526/307.1 X

FOREIGN PATENT DOCUMENTS 1271399 6/1968 Fed. Rep. of Germany ... 526/307.7
1495692 5/1973 Fed. Rep. of Germany ... 526/303.1
59-33312 2/1984 Japan .
59-39400 3/1984 Japan .
1141712 6/1986 Japan .............................. 526/303.1

OTHER PUBLICATIONS

D. Dawson et al., J. Amer. Chem. Soc., 98:5996–6000, (1976).

Primary Examiner—Joseph L. Schofer
Assistant Examiner—J. M. Reddick
Attorney, Agent, or Firm—David G. Conlin; Ronald I. Eisenstein

[57]  ABSTRACT

Disclosed herein are an N-vinylformamide copolymer having the structural units represented by the following formulas (I) and (II):

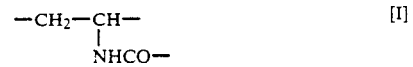

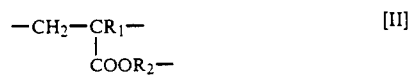

wherein $R_1$ represents a hydrogen atom or a methyl group and $R_2$ represents an alkyl group of 1 to 4 carbon atoms, in which the molar ratio between the structural units (I) and (II) is from 20:80 to 95:5, and a process for producing the N-vinylformamide copolymer.

9 Claims, No Drawings

VINYLAMINE COPOLYMER AND PROCESS FOR PRODUCING SAME

This is a continuation of co-pending application Ser. No. 065,811 filed on Jun. 23, 1987, now abandoned.

BACKGROUND OF THE INVENTION

The present invention relates to an N-vinylformamide copolymer as the starting material for the production of a hydrophobic and high-molecular weight vinylamine copolymer obtained by modifying formyl groups in the N-vinylformamide copolymer, as well as a process for producing the same. More particularly, the present invention relates to a N-vinylformamide copolymer having the structural units represented by the following formulas (I) and (II):

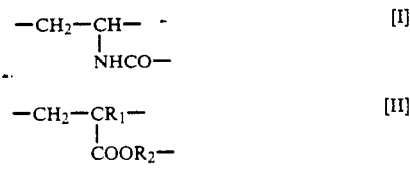

wherein $R_1$ represents a hydrogen atom or a methyl group and $R_2$ represents an alkyl group of 1 to 4 carbon atoms, in which the molar ratio between the structural units (I) and (II) is from 20 : 80 to 95 : 5, as well as a process for producing the N-vinylformamide copolymer.

A vinylamine copolymer obtained by modifying the formyl groups in N-vinylformamide copolymer according to the present invention has an excellent effect in the field of application of cationic polymers such as flocculating agent for the treatment of waste water, dehydrating agent for organic sludges, as well as drainage aid, retention aid and paper strength increasing agent in papermaking industry, etc.

It has been known for the process of producing a polyvinylamine by the Hofmann reaction of polyacrylamide and hydrolysis of poly-N-vinylamide. Among all, the method of hydrolyzing a homopolymer of N-vinylformamide is excellent method which is capable of synthesizing a polyvinylamine of a high-molecular weight with high stability. However, the resultant polymer has an extremely high hydrophilic property and only an insufficient effect in the case of using the polymer as a dehydrating flocculating. For providing the polyvinylamine with a hydrophobic property, there has been known a method of previously copolymerizing N-vinylformamide and ethylene and then hydrolyzing the resultant product, but it was difficult to solve the problem by the copolymer, since the copolymerizability between N-vinylformamide and ethylene is not satisfactory and, in addition, it is difficult to obtain a copolymer of high molecular weight.

In order to overcome the foregoing drawbacks, the present inventors have made an earnest study and, as a result, it has been found that a polyvinylamine copolymer obtained by modifying the formyl groups in the N-vinylformamide copolymer having the structural units represented by the following formulas (I) and (II):

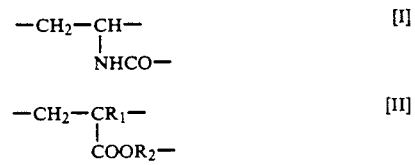

wherein $R_1$ represents a hydrogen atom or a methyl group and $R_2$ represents an alkyl group of 1 to 4 carbon atoms, in which the molar ratio between the structural units (I) and (II) is from 20:80 to 95:5 is a hydrophobic and high molecular weight polymer, and exhibits an excellent effect as a flocculating agent for use in the treatment of waste water and a paper strength increasing agent in papermaking industry, and based on the finding, the present invention has been attained.

The object of the present invention is to provide an N-vinylformamide copolymer capable of forming a high-molecular weight vinylamine copolymer having a hydrophobic property through a modifying reaction. The foregoing object of the present invention can be attained by an N-vinylformamide copolymer having the structural units represented by the formulas (I) and (II):

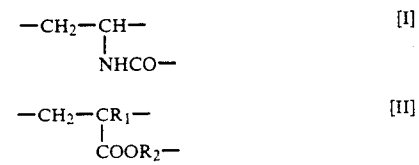

wherein $R_1$ represents a hydrogen atom or a methyl group and $R_2$ represents an alkyl group of 1 to 4 carbon atoms, in which the molar ratio between the structural units (I) and (II) is from 20:80 to 95:5.

SUMMARY OF THE INVENTION

In a first aspect of the present invention, there is provided an N-vinylformamide copolymer having the structural units represented by the following formulas (I) and (II):

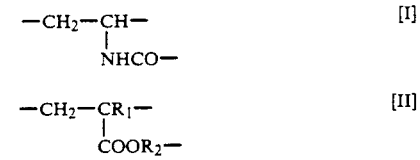

wherein $R_1$ represents a hydrogen atom or a methyl group and $R_2$ represents an alkyl group of 1 to 4 carbon atoms, in which the molar ratio between the structural units (I) and (II) is from 20:80 to 95:5.

In a second aspect of the present invention, there is provided a process for producing an N-vinylformamide copolymer having the structural units represented by the following formulas (I) and (II):

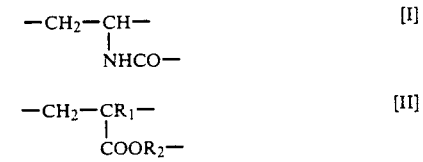

wherein $R_1$ represents a hydrogen atom or a methyl group and $R_2$ represents an alkyl group of 1 to 4 carbon atoms, in which the molar ratio between the structural units (I) and (II) is from 20:80 to 95:5, which comprises polymerizing a mixture of an N-vinylformamide and a compound of the following general formula (VI):

(VI)

wherein $R_1$ represents a hydrogen atom or a methyl group and $R_2$ represents an alkyl group of 1 to 4 carbon atoms at a molar ratio from 20:80 to 95:5 under the presence of a radical polymerization initiator.

DETAILED DESCRIPTION OF THE INVENTION

The N-vinylformamide copolymer according to the present invention has a composition between the structural units (I) and (II) in the molar ratio of 20:80 to 95:5 and a preferred composition between the structural units (I) and (II) in the molar ratio of 40:60 to 95:5 and a particularly preferred composition between the structural units (I) and (II) in the molar ratio of 40:60 to 90:10.

The N-vinylformamide copolymer according to the present invention is a linear polymer having a reduced viscosity from 0.1 to 10 dl/g and, preferably, from 0.5 to 10 dl/g measured as a solution thereof prepared by dissolving the copolymer in a solvent comprising dimethylsulfoxide and water at a ratio of 7:3 to a concentration of 0.1 g/dl at a temperature of 25° C.

The novel N-vinylformamide copolymer according to the present invention can be prepared by polymerizing, in the presence of a radical polymerization initiator, a mixture of an N-vinylformamide and a compound represented by the general formula (III):

(III)

wherein $R_1$ represents a hydrogen or a methyl group and $R_2$ represents an alkyl group of 1 to 4 carbon atoms, at a molar ratio from 20:80 to 95:5, preferably from 40:60 to 95:5 and, particularly preferably, from 40:60 to 90:10.

As the compound represented by the general formula (III), methyl acrylate, ethyl acrylate, n-propyl acrylate, isopropyl acrylate, n-butyl acrylate, isobutyl acrylate, sec-butyl acrylate, methyl methacrylate, ethyl methacrylate, n-propyl methacrylate, iso-propyl methacrylate, n-butyl methacrylate, isobutyl methacrylate, sec-butyl methacrylate may be exemplified. Those preferred are methyl acrylate, methyl methacrylate, ethyl acrylate and ethyl methacrylate, methyl acrylate or methyl methacrylate being particularly preferred.

For the polymerization method of producing N-vinylformamide, there can be used mass polymerization and solution polymerization or precipitation polymerization using water and various organic solvents. Water, an organic solvent having a boiling point from 60° to 110° C. and a mixture of a hydrophilic organic solvent having a boiling point from 60° to 110° C. with water may be used as a preferred polymerization solvent. In the case of polymerizing a monomer in the form of an aqueous solution, the monomer concentration, the polymerization method and the configuration of a polymerizing reactor are properly selected considering the molecular weight of the objective polymer and the calorific control from heat of polymerization. The polymerization is carried out by the following method: (1) a method of polymerizing in a state of a solution with a monomer concentration of 5 to 20 % by weight and preparing the polymer as a precipitate, (2) a method of polymerizing with monomer concentration from 20 to 60 % by weight and preparing the polymer as a gel-like product or precipitate containing the solvent and (3) a method of polymerizing a solution of a mixture with a monomer concentration of 20–60 % by weight in a state of an emulsion or dispersion by using a solvent not dissolving the monomer.

As the radical polymerization initiator, there can be used any of usual initiators used generally for the polymerization of a water soluble or hydrophilic monomer and azo compounds are preferred for producing a polymer at a high yield. In the case of using water as the polymerizing solvent, water soluble azo compounds are preferred, for example, hydrochlorides and acetates of 2,2'-azobis-2-amidinopropane; sodium salt of 4,4'-azobis-4-cyano valeric acid; and hydrochlorides and sulfates of azobis-N,N'-dimethylene isobutylamidine, etc. The amount of the polymerization initiator used lies within a range usually from 0.01 to 1 % by weight based on the weight of the monomer. The polymerizing reaction is generally carried out under an inert gas stream at a temperature from 30° to 100° C.

The thus obtained N-vinylformamide copolymer can be modified in the form as it is, a solution, a dispersion or dilute solution of the polymer or a powder obtained by dehydrating or drying the polymer in the known method, whereby a novel polyvinylamine can be obtained.

By the way, the novel polyvinylamine copolymer obtained from the N-vinylformamide copolymer according to the present invention have the structural units represented by the formulas (IV), (I), (II), and (V):

[IV]

[I]

[II]

[V]

(wherein $X^\ominus$ represents an anion or hydroxyl ion, $R_1$ represents a hydrogen atom or a methyl group, $R_2$ represents an alkyl of 1 to 4 carbon atoms, and $M^\oplus$ represents a hydrogen ion or a monovalent cation), in which the molar fraction of the structural unit (IV) is 5 to 85 % by mole, the molar fraction of the structural unit (I) is 2 to 85 % by mole, the molar fraction of the structural unit (II) is 5 to 80 % by mole, and the molar fraction of the structural unit (V) is 0 to 20 % by mole. A preferred structural unit composition is: from 5 to 85 mol% of the structural unit (IV) in the molar fraction, from 2 to 85 mol% of the structural unit (I) in the molar fraction, from 5 to 60 mol% of the structural unit (II) in the molar fraction and from 0 to 15 mol% of the structural unit (V) in the molar fraction, and a particularly preferred structural unit composition is: from 5 to 85 mol% of the structural unit (IV) in the molar fraction, from 5 to 60 mol% of the structural unit (I) in the molar fraction, from 10 to 60 mol% of the structural unit (II) in the molar fraction, and from 0 to 15 mol% of the structural unit (V) in the molar fraction.

The vinylamine copolymer obtained from N-vinylformamide copolymer according to the present invention is a water-soluble polymer having a reduced viscosity from 0.1 to 10 dl/g and, preferably, from 0.5 to 10 dl/g measured as a solution thereof prepared by dissolving the copolymer in aqueous 1N sodium chloride solution to a concentration of 0.1 g/dl at 25° C.

For the production of the vinylamine copolymer, a method of modifying the N-vinylformamide copolymer according to the present invention under a basic or acidic condition may be used. In the case where hydrolysis is conducted in water under a basic condition, ester groups in the polymer are converted into carboxyl groups, and it tends to result in an amphoteric copolymer predominantly containing anionic groups, which constitutes an excellent production process for a highly water-soluble amphoteric polymer. However, for producing a polyvinylamine having a hydrophobic property, it is preferred to apply the modification under an acidic condition. As a preferred modification method for the N-vinylformamide copolymer according to the present invention, there can be mentioned, for example, (1) a method of hydrolyzing in water under an acidic condition, (2) a method of hydrolysis in a hydrophilic solvent such as a water-containing alcohol under an acidic condition and (3) a method of subjecting to alcohol-addition degradation and modifying formyl groups while, separating as esters of formic acid. Alcohol-addition degradation under the acidic condition is particularly preferred. A vinylamine copolymer containing no substantial carboxyl groups can be obtained by this method. As the alcohols in the case of alcohol-addition degration, those alcohol of 1 to 4 carbon atoms can be mentioned and methanol is preferred.

As the modifying agent used in the case of the acidic modification, any of compounds acting strongly acidity can be used and it can exemplify, for example, hydrochloric acid, bromic acid, hydrofluoric acid, sulfuric acid, nitric acid, phosphoric acid, sulfamic acid and alkane sulfonic acid. The amount of the modifying agent used may properly be selected from a range from 0.1 to 2 times to the molar quantity of the formyl groups in the polymer according to the desired rate of modification.

The modifying reaction is usually carried out under the temperature condition usually from 40° to 100° C.

The vinylamine copolymer obtained from N-vinylformamide copolymer according to the present invention exhibits an excellent effect as a cationic flocculating agent for the treatment of waste water for flocculating organic suspensions, a flocculating agent for the dehydration of organic sludges, etc. Particularly, it exhibits an excellent effect as a dehydrating flocculating agent for primary settled raw sludges in the treatment of sewage, sludges produced by the activated sludge treatment of water soluble organic materials the sludges produced in the aerophobic treatment of water soluble organic materials and mixtures thereof. The vinylamine copolymer is used in the same manner as in the method of using conventional cationic flocculating agents, for example, polymers of dimethylaminoethyl methacrylate. That is, the vinylamine copolymer is used in the form of an aqueous 0.1-0.5 wt% solution, and it is added and mixed in an organic sludge-containing suspension in amount of 20 to 20,000 ppm based on the weight of the suspension.

In the case of using the vinylamine copolymer obtained by modifying the N-vinylformamide copolymer according to the present invention as a flocculating agent, it is preferred that the vinylamine copolymer is a water soluble polymer having a reduced viscosity of 1 to 10 dl/g measured as a solution thereof prepared by dissolving the copolymer in aqueous 1N sodium chloride solution to a concentration of 0.1 g/dl at a temperature of 25° C. Since the organic sludges subjected to the flocculating treatment by using the vinylamine copolymer obtained from N-vinylformamide copolymer according to the present invention is formed more firm and solid flocks than in the case of using a polymer obtained by modifying a homopolymer of N-vinylformamide, the dehydrating speed is improved, the throughput rate is increased and the water content in the dehydrated sludges is reduced by subjecting to machine dehydration such as compression dehydration, centrifuging vacuum filtration etc. by use of a belt press, screw press, filter press, etc.

The vinylamine copolymer obtained from N-vinylformamide copolymer according to the present invention can be used also as a cationic water-soluble polymer for papermaking industry and exhibits an excellent effect in use as drainage aid, retention aid and paper strength increasing agent. In the case of using the vinylamine copolymer for such applications, a water-soluble polymer having a reduced viscosity from 0.5 to 10 dl/g measured as a solution thereof prepared by dissolving the copolymer in 1N aqueous sodium chloride solution to a concentration of 0.1 g/dl at 25° C. It can be used by any of known papermaking methods.

That is, a cationic polymer which of an amount equivalent to 0.01-2 % by weight based on the dry weight of pulp is added as a 0.1-5 wt% aqueous solution to a pulp slurry containing 0.5-3 % by weight of pulp and then subjected to a papermaking step. In the case of using the copolymer as a paper strength increasing agent, a method of adding to the pulp slurry as an internal additive may be used, or it may be coated onto wet or dry web by a roll coater, size press or dipping machine. If necessary, cationic starch, aluminum sulfate and anionic polyacrylamide may be used jointly with the polymer obtained from N-vinylformamide copolymer of the present invention. It can be used for any of ground pulp, sulfide pulp, craft pulp and beaten wastepaper with no restriction to the type of the pulps.

The cationic polymer is extremely stable in the form of an aqueous solution irrespective of the quality of the solution in which the cationic polymer is dissolved or even if in the form of a diluted aqueous solution. Further, it is stable and does not lose its effect even under the weakly alkaline papermaking conditions when using calcium carbonate as a filler and the additive is excellent under neutral or weakly alkaline papermaking condition.

The novel vinylformamide copolymer according to the present invention contributes much as the starting material to the synthesis of a high molecular weight vinylamine copolymer having hydrophobic groups in the molecules to the field of applying flocculating agents and papermaking additives.

The present invention will now be described in more details by way of examples but it should be noted that the invention is no way limited to the following examples unless they do not go beyond the gist of the invention.

EXAMPLES 1-8

(Preparation of N-Vinylformamide Copolymer)

Into a 50 ml four-necked flask equipped with a stirrer, a nitrogen introduction tube and a cooling tube, 5.0 g of a mixture of N-vinylformamide containing comonomers of the type and molar ratio (mol%) as shown in Table 1 was charged as a solution of the polymerization solvent shown in Table 1 at the monomer concentration also shown in Table 1. After increasing the temperature to 60° C. under stirring in a nitrogen gas stream, 0.15 g of an aqueous 10 wt% solution of 2,2'-azobis-2-amidinopropane dihydrochloride was added. After stopping the stirring and nitrogen introduction, the resultant mixture was maintained at 60° C. for three hours to obtain an emulsified hydrous gel-like product. After dehydrating the product with acetone, it was dried in vacuum to obtain each of solid polymers (hereinafter referred to as polymers A-H).

Each of the compositions ratio of the structural units in the polymer determined based on the elemental analysis of the formed product, as well as the reduced viscosity of the polymer measured in a solvent (dimethylsulfide-water: 7/2 weight ratio) are shown in Table 2.

Measurement for Reduced Viscosity

The solid polymer was dissolved in a solvent (dimethylsulfide/water in 7/3 weight ratio) to a concentration of 0.1 g/dl and the reduced viscosity at 25° C. was measured by using an Ostwald viscometer.

Reduced viscosity $(dl/g) = (t - t_0)/t_0/0.1$ (wherein $t_0$ represents descending speed of aqueous sodium chloride and t represents descending speed of polymer solution.)

TABLE 1

| Example | Comonomer Type | Molar ratio | Polymerization solvent | Monomer concentration (wt %) |
|---|---|---|---|---|
| 1 | Methyl acrylate | 0.20 | water | 50 |
| 2 | Methyl acrylate | 0.30 | water | 50 |
| 3 | Methyl acrylate | 0.40 | water | 50 |
| 4 | Methyl methacrylate | 0.10 | water | 50 |
| 5 | Methyl methacrylate | 0.20 | water | 50 |
| 6 | Methyl methacrylate | 0.30 | water | 50 |
| 7 | Methyl methacrylate | 0.40 | water | 50 |
| 8 | n-butyl acrylate | 0.30 | t-butanol | 20 |

Note: Azobis isobutyronitrile was used as the polymerization initiator in Example 8.

TABLE 2

| Example | Polymer | Structural unit I (mol %) | Structural unit II $R_1$ | $R_2$ | (mol %) | Reduced viscosity (dl/g) |
|---|---|---|---|---|---|---|
| 1 | A | 80 | H | $CH_3$ | 20 | 3.9 |
| 2 | B | 70 | H | $CH_3$ | 30 | 3.3 |
| 3 | C | 60 | H | $CH_3$ | 40 | 2.2 |
| 4 | D | 90 | $CH_3$ | $CH_3$ | 10 | 4.6 |
| 5 | E | 80 | $CH_3$ | $CH_3$ | 20 | 4.5 |
| 6 | F | 70 | $CH_3$ | $CH_3$ | 30 | 3.4 |
| 7 | G | 60 | $CH_3$ | $CH_3$ | 40 | 2.4 |
| 8 | H | 58 | H | $nBu^1$ | 42 | 0.4 |

Note: [1] nBu: represents n-butyl group.

EXAMPLES 9-17

(Polymer Modification Example)

Into a 50 ml four-necked flask equipped with a stirrer and a cooling tube, 2.0 g of each of the powdery polymers A-H, 16.0 g of methanol and one equivalent of methane sulfonic acid to the formyl groups in the polymer were charged and maintained at 65° C. for 6 hours under stirring. The solution of the resultant polymer was added to acetone and precipitated, which was dried under vacuum to obtain a solid polymer (hereinafter referred to as polymer a-h).

The composition for each of the formed products was determined based on the colloidal equivalent value, the atomic ratio for carbon, nitrogen and sulfur due to the elemental analysis and NMR spectrum, and shown together with the reduced viscosity of each of the products in Table 3.

Measurement for Colloidal Equivalent Amount

Solid polymer was dissolved into desalted water to a concentration of 0.1 % by weight. After diluting 5.0 g of the aqueous solution using desalted water into 200 ml, pH value of the solution was adjusted to 3 by using a diluted hydrochloric acid. The colloidal equivalent value was determined by using 1/400 N polyvinyl potassium sulfate and using toluidine blue as an indicator.

Measurement for Reduced Viscosity

The solid polymer was dissolved an aqueous 1N solution of sodium chloride solution to a concentration of 0.1 g/dl and the reduced viscosity at 25° C. was measured by using an Ostwald viscometer.

Reduced viscosity $(dl/g) = (t - t_0)/t_0/0.1$ (wherein $t_0$ represents descending speed of aqueous sodium chloride and t represents descending speed of polymer solution.)

EXAMPLE 18

A polymer was modified in the same procedures as in Example 11 except for using water instead of methanol used in Example 11. The composition and the reduced viscosity for the thus modified product (hereinafter referred to as a polymer i) in the same manner as in Examples 9-17. The results are shown in Table 3.

COMPARATIVE EXAMPLE 1

The polymer was modified in the same procedures as in Example 11 except for using water instead of methanol and sodium hydroxide instead of methane sulfonic acid used in Example 11. After acidifying the product with methane sulfonic acid, the product was precipitated in acetone to obtain a solid polymer (hereinafter referred to as a polymer j). The thus modified product was a water soluble polymer easy to be salted out in aqueous sodium chloride. The composition measured by the method as described above is shown in Table 3.

TABLE 3

| Example | Polymer | Starting polymer | Structural unit of the Product (mol %) $IV^{1,2}$ | I | $II^2$ | $V^3$ | Reduced viscosity dl/g |
|---|---|---|---|---|---|---|---|
| 9 | a | A | 53 | 27 | 20 | 0 | 2.2 |
| 10 | b | B | 48 | 22 | 30 | 0 | 2.7 |
| 11 | c | C | 53 | 7 | 40 | 0 | 0.6 |
| 12 | d | D | 61 | 29 | 10 | 0 | 2.5 |
| 13 | e | E | 57 | 23 | 20 | 0 | 2.3 |
| 14 | f | F | 51 | 19 | 30 | 0 | 2.6 |
| 15 | g | G | 47 | 13 | 40 | 0 | 2.6 |
| 16 | h | H | 32 | 24 | 44 | 0 | 1.3 |

TABLE 3-continued

| Example | Polymer | Starting polymer | Structural unit of the Product (mol %) | | | | Reduced viscosity dl/g |
|---|---|---|---|---|---|---|---|
| | | | IV[1,2] | I | II[2] | V[3] | |
| 17 | i | C | 30 | 30 | 37 | 3 | 2.2 |
| Comparative Example 1 | j | B | 24 | 46 | 1 | 29 | — |

Note:
[1] Ion X in the structural unit (IV) is a methane sulfonic ion.
[2] $R_1$ and $R_2$ in the structural unit (II) and $R_1$ in the structural unit (IV) are identical with $R_1$ and $R_2$ in the starting polymers A–H (Table 2).
[3] M in the structural unit (V) is hydrogen atom.

EXAMPLES 18–24 AND COMPARATIVE EXAMPLE 2, 3

(Flocculating Performance of Modified Products)

100 ml (2.0 % by weight of solid content) of mixed raw sludges obtained from sewage treatment plant of A city were put into a 200 ml - polyethylene beaker and 5 ml of an aqueous 0.2 wt% solution of each of the polymers a–g prepared in the previous examples and each of the polymers K–L shown in Table 4 were added thereto. The mixture was agitated by using a stirrer having at its end three rods of 5 mm in diameter and 20 mm in length at a speed of 1000 rpm for 10 sec. The flocculating sludges were charged in a cylinder bottomed with a 60 mesh nylon screen having a diameter of 65 mm and subjected to gravity-filtration, and the amount of the filtrate after 10 sec. was measured. Further, a portion of the gravity-filtrated sludges was charged in a centrifuging basket having a dish drainer at its bottom and centrifuged at a speed of 3000 rpm for 30 sec for dehydration. The sludges after the dehydration were dried at 110° C. for 6 hours and the solid content was measured to calculate the water content in the sludges after centrifuging dehydration.

The results are shown in Table 4.

TABLE 4

| Example | Polymer | Amount of filtrate 10 sec. after gravity-filtration (ml) | Water content of sludge after centrifuging dehydration (wt %) |
|---|---|---|---|
| 18 | a | 42 | 80.5 |
| 19 | b | 48 | 79.6 |
| 20 | c | 39 | 84.1 |
| 21 | d | 48 | 81.9 |
| 22 | e | 42 | 82.1 |
| 23 | f | 39 | 83.6 |
| 24 | g | 38 | 83.7 |
| Comparative Example 2 | K[1] | 34 | 86.8 |
| Comparative Example 3 | L[2] | not coagulated | — |

[1] Polymer K: Copolymer of 2-methacryloyloxyethyl trimethyl ammonium chloride and acrylamide (molar ratio: 2/8) (reduced viscosity: 10.7 dl/g)
[2] Polymer L: Hydrolyzate of N-vinylamide - ethylene copolymer (molar ratio: 56/44) Modification ratio: 59 mol %, reduced viscosity: 0.2 dl/g

EXAMPLES 25–30 AND COMPARATIVE EXAMPLE 4

(Paper Strength Increasing Effect of Modification Product)

500 ml of an aqueous 1 % LBKP slurry having a freeness of 435 ml measured by Canadian Standard was charged into a beaker and each of the polymers a–c and e–g as an aqueous 1 wt% solution was added in an amount of 0.4 % by weight based on the dry weight of the pulp, and then maintained for one minute. Papers of 60 g of basis weight were made by using a TAPPI Standard square type paper machine. For the comparison, paper was made in the same procedures as above described but without adding any of the polymers.

The thus obtained wet paper was dried for three minutes by using a drum drier at 120° C. After allowing to stand the resultant paper under the condition at a temperature of 20° C. and relative humidity of 60 %, the specific burst factor and the burst length were measured in accordance with JIS P 8112 and JIS P 8113.

$$\text{Specific burst factor} = \frac{S_1}{W} \times 100 \ (\text{kg/cm}^2)$$

$$\text{Burst length} = \frac{S_2}{B \times W} \times 1000 \ (\text{km})$$

where
$S_1$: Burst strength (kg/cm$^2$)
W: basis weight of test paper (g/m$^2$)
$S_2$: tensile strength (kg)
B: width of the test piece (mm)

The results are shown in Table 5.

TABLE 5

| Example | Polymer | Specific burst factor (Kg/cm$^2$) | Burst length (Km) |
|---|---|---|---|
| 25 | a | 2.46 | 4.23 |
| 26 | b | 2.57 | 4.44 |
| 27 | c | 2.63 | 4.60 |
| 28 | e | 2.60 | 4.44 |
| 29 | f | 2.74 | 4.57 |
| 30 | g | 2.58 | 4.40 |
| Comparative Example 4 | not added | 2.06 | 3.85 |

EXAMPLES 31–36 AND COMPARATIVE EXAMPLE 5

(Drainage Aid Effect of Modification Product)

One liter of 0.3 % LBKP slurry having a freeness of 220 ml as measured by Canadian Standard was put into a 2 liter-beaker and each of the polymers a–c and e–g as an aqueous 0.2 wt% solution was added in an amount of 0.2% by weight based on the dry weight of the pulp under stirring. After stirring the mixture at a speed of 200 rpm for one minute and then the freeness of each product was measured by using a Canadian Freeness Tester. For the comparison, an experiment was conducted in the same way without adding any of the polymers. The results are shown in Table 6.

TABLE 6

| Example | Polymer | Freeness (ml) |
|---|---|---|
| 31 | a | 333 |
| 32 | b | 338 |
| 33 | c | 320 |
| 34 | e | 326 |
| 35 | f | 326 |
| 36 | g | 308 |
| Comparative Example 5 | not added | 220 |

EXAMPLES 37–41 AND COMPARATIVE EXAMPLE 6

(Retention Aid Effect of Modification Product)

One liter of 0.5 % LBKP slurry having a freeness of 410 ml measured by Canadian Standard was put into a 2 liter beaker and 30 % by weight of papermaking talc, 0.3 % by weight of reinforcing rosin and 4 % by weight of aluminum sulfate based on the dry weight of the pulp were respectively added under stirring. Further, after adding an aqueous 0.2 wt% solution of each of the polymers a–c and e–g in an amount of 0.03 % by weight based on the pulp and stirring at a speed of 200 rpm for one minute, papers of 70 g basis weight were made by the same procedures as in Example 27.

For the comparison, paper was made in the same procedures but without adding any of the polymers The ash content in the resultant paper was measured and the results are shown in Table 7.

TABLE 7

| Example | Polymer | Ash content (%) |
|---|---|---|
| 37 | a | 16.6 |
| 38 | b | 16.3 |
| 39 | c | 17.0 |
| 40 | e | 16.7 |
| 41 | f | 16.4 |
| Comparative Example 6 | not added | 11.9 |

What is claimed is:

1. A vinylamine copolymer having the structural units represented by the following formulas (I), (II), (IV) and (V):

$$-CH_2-CH- \atop | \atop NHCO \qquad (I)$$

$$-CH_2-CR^1- \atop | \atop COOR^2 \qquad (II)$$

$$-CH_2-CH- \atop | \atop NH_3^+X^- \qquad (IV)$$

$$-CH_2-CR^1- \atop | \atop COO^-M^+ \qquad (V)$$

wherein $X^-$ represents an anion or hydroxyl ion, $R^1$ represents a hydrogen atom or a methyl group, $R^2$ represents an alkyl group of 1 to 4 carbon atoms and $M^+$ represents a hydrogen ion or a monovalent cation, in which the molar ratio (I): (II): (IV): (V) is 2 to 85:5 to 80:5 to 85:0 to 20 and the reduced viscosity of said copolymer measured as a solution of concentration 0.1 g/dl at 25° C. in aqueous 1N sodium chloride solution is 0.1 to 10 dl/g.

2. The vinylamine copolymer according to claim 1 wherein said molar ratio is 2 to 85: 5 to 60: 5 to 85: 0 to 15.

3. The vinylamine copolymer according to claim 1 wherein said molar ratio is 5 to 60: 10 to 60: 5 to 85: 0 to 15.

4. The vinylamine copolymer according to claim 1 wherein the reduced viscosity of said copolymer measured as a solution of concentration 0.1 g/dl at 25° C. in aqueous 1N sodium chloride solution is 0.1 to 10 dl/g.

5. A process for producing a vinylamine copolymer having the structural units represented by the following formulas (I), (II), (IV) and (V):

$$-CH_2-CH- \atop | \atop NHCHO \qquad (I)$$

$$-CH_2-CR^1- \atop | \atop COOR^2 \qquad (II)$$

$$-CH_2-CH- \atop | \atop NH_3^+X^- \qquad (IV)$$

$$-CH_2-CR^1- \atop | \atop COO^-M^+ \qquad (V)$$

wherein $X^-$ represents an anion or hydroxyl ion, $R^1$ represents a hydrogen atom or a methyl group, $R^2$ represents an alkyl group of b 1 to 4 carbon atoms and $M^+$ represents a hydrogen ion or a monovalent cation, in which the molar ration (I): (II): (IV): (V) is 2 to 85: 5 to 80: 5 to 85: 0 to 20, which comprises acidic modification of an N-vinylformamide copolymer having the structural units represented by the following formulas (I) and (II):

$$-CH_2-CH- \atop | \atop NHCHO \qquad (I)$$

$$-CH_2-CR^1- \atop | \atop COOR^2 \qquad (II)$$

wherein $R^1$ and $R^2$ are the same as defined above, in which the molar ratio of the structural units (I) and (II) is 20:80 to 95:5.

6. The process according to claim 5 wherein said modification comprises hydrolyzing said N-vinylformamide copolymer in a solvent under acidic condition.

7. The process according to claim 6 wherein said solvent is water or a hydrophilic solvent.

8. The process according to claim 5 wherein said modification comprises subjecting said N-vinylforamide copolymer to alcohol-addition degradation to modify formyl groups under acidic condition.

9. The process according to claim 5, wherein said modification is carried out at a temperature of 40° to 100° C.

* * * * *